United States Patent [19]
Richards et al.

[11] 3,991,168
[45] Nov. 9, 1976

[54] SHEET INTERLEAVING OF FROZEN FOOD PATTIES

[75] Inventors: Louis R. Richards, Mokena; Richard W. Dorr, Lockport, both of Ill.L

[73] Assignee: Formax, Inc., Mokena, Ill.

[22] Filed: Sept. 9, 1974

[21] Appl. No.: 504,186

[52] U.S. Cl. ............................ 426/420; 426/119; 426/132; 53/157
[51] Int. Cl.² ...................... A23L 1/31; A23B 4/06
[58] Field of Search ......... 426/420, 115, 125, 132, 426/106, 119, 124, 129, 392, 393, 410, 413, 414; 53/157 P, 156, 141

[56] References Cited
UNITED STATES PATENTS

| | | | |
|---|---|---|---|
| 2,114,530 | 4/1938 | Gorton | 426/393 X |
| 2,665,993 | 1/1954 | Swanson | 426/119 |
| 2,813,033 | 11/1957 | Schneider | 426/420 X |
| 3,092,501 | 6/1963 | Beck | 426/119 |
| 3,152,915 | 10/1964 | Cover | 426/119 |
| 3,236,369 | 2/1966 | Moore | 426/119 X |
| 3,647,485 | 3/1972 | Seifeith | 426/129 X |
| 3,772,040 | 11/1973 | Benson | 426/420 |

FOREIGN PATENTS OR APPLICATIONS

| | | | |
|---|---|---|---|
| 223,807 | 8/1959 | Australia | 426/414 |

Primary Examiner—Robert Halper
Attorney, Agent, or Firm—Kinzer, Plyer, Dorn & McEachran

[57] ABSTRACT

A method and apparatus for interleaving frozen food patties with sheets of protective material (e.g., paper), in which at least a spot of an edible "adhesive" material adheres each protective sheet to a patty. In one embodiment, a spot of a true adhesive (e.g., honey, sugar solution, etc.) is applied to a protective sheet that is subsequently moved into engagement with a frozen food patty. In another embodiment, at least a spot of an edible heat-activated adhesive material at the interface between a protective sheet and a frozen patty is activated by heat applied through the protective sheet. In this instance, the adhesive may be a separate material which is applied to either the protective sheet or the food patty; on the other hand, the adhesive may comprise moisture in the surface portion of the patty.

11 Claims, 6 Drawing Figures

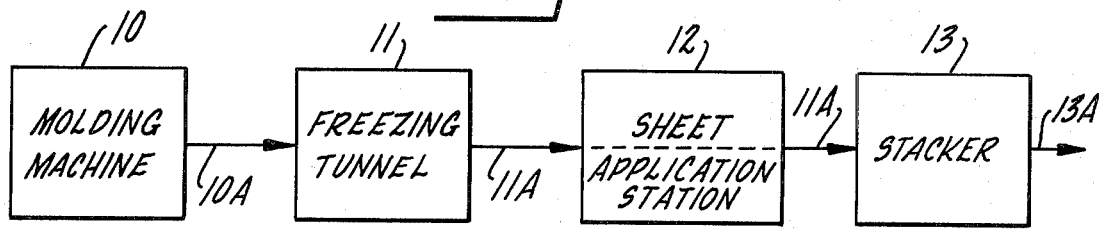
fig.1.
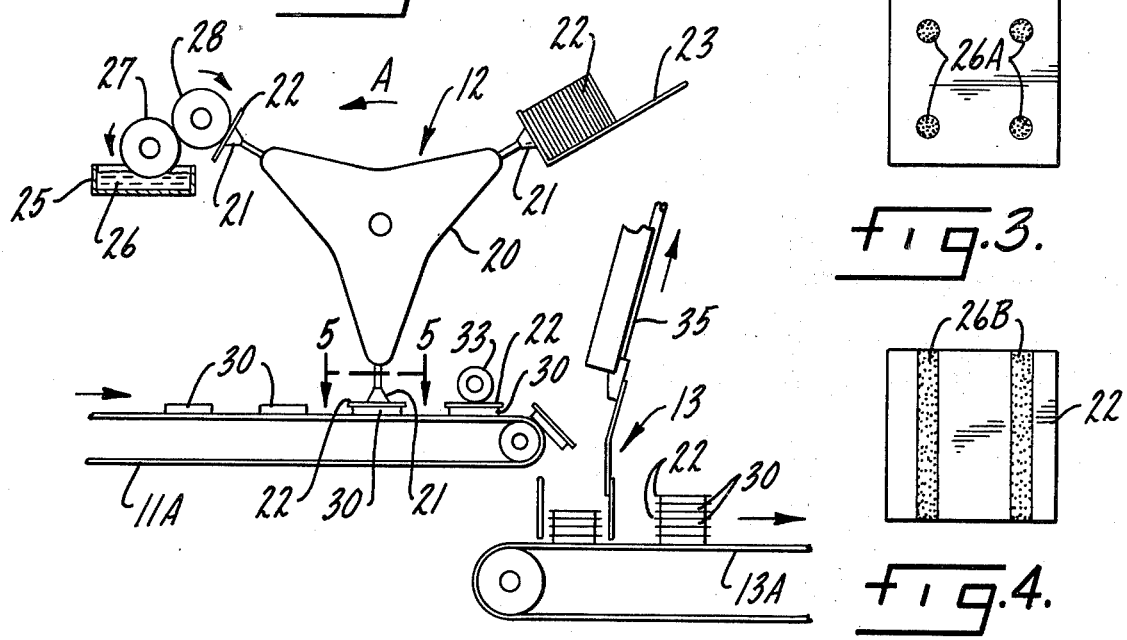
fig.2.
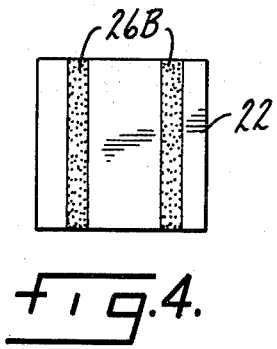
fig.3.
fig.4.
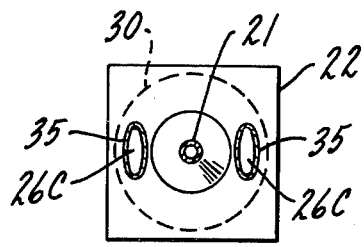
fig.5.
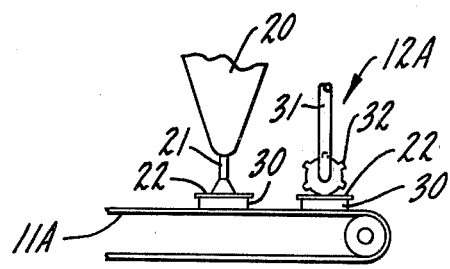
fig.6.

SHEET INTERLEAVING OF FROZEN FOOD PATTIES

BACKGROUND OF THE INVENTION

This invention relates generally to interleaving of protective sheets of paper, plastic, or the like with frozen food patties, and more particularly concerns the application of such protective sheets after the food patties have been frozen.

Traditional methods of interleaving protective sheets with frozen food patties entail applying the protective sheets to the food patties before freezing. However, this presents several problems and limitations; it limits the possibilities of further operations on the patty, such as cubing, breading and scoring, it makes the separation of the patty and the protective sheet difficult after freezing due to large surface adherence, and it has an insulating effect on the unfrozen patty, causing the freezing process to be less efficient.

U.S. Pat. No. 3,772,040 describes a method and machine for inserting protective sheets between falling frozen food patties in a patty stacker. However, placement of loose sheets between frozen patties suffers from several disadvantages; for example, when the stacks are altered or moved about during packaging, storage, or shipment, the sheets are prone to sliding and separating from the food patties.

SUMMARY OF THE INVENTION

One object of the invention is to provide for attachment of protective sheets to food patties after the patties have been frozen.

Another object is to provide for firm adherence between each protective sheet and its associated frozen food patty, so that the patties can be manipulated, restacked or sorted after attachment of the protective sheets.

A further object is to provide a new and improved method and apparatus for interleaving protective sheets with previously frozen food patties that affords firm attachment of each sheet to a patty while the patty remains frozen but allows ready detachment when the patty is thawed.

In accordance with one embodiment of the invention, frozen food patties are fed along a given path toward a stacking station, an edible adhesive material is applied to a localized area on a sheet of protective material or on the surface of each patty, and the sheet of protective material is then engaged with the frozen food patty, the adhesive material attaching the sheet to the patty. The procedure is repeated for each patty, and the patties and adhering protective sheets are stacked in the stacking station. In another embodiment an edible adhesive located at the interface between a protective sheet and a frozen food patty is heat-activated after the protective sheet is engaged with the frozen food patty, the heat being applied through the protective sheet to activate the adhesive and cause the adhesive material to attach the sheet to the patty. This latter embodiment may utilize a separate adhesive applied to the protective sheet or to the patty; alternatively, the adhesive may comprise moisture in the surface portion of the patty.

BRIEF DESCRIPTION OF THE DRAWINGS

FIG. 1 is a block diagram showing the basic functions in preparing food patties interleaved with protective sheets, utilizing the present invention;

FIG. 2 shows one form of interleaving apparatus constructed in accordance with the invention, including a stacker;

FIGS. 3 and 4 show two different adhesive application patterns which may be employed in practicing the invention;

FIG. 5 is a detail sectional view, taken approximately along line 5—5 in FIG. 2, illustrating another embodiment of the invention, employing a heat-activating device; and FIG. 6 shows another form of the interleaving apparatus, utilizing a different heat application device.

DETAILED DESCRIPTION OF THE INVENTION

FIG. 1 is a block diagram which shows the general functions performed in preparing frozen food patties, utilizing the present invention. It includes a molding machine 10, which can be any of the types conventionally used to mold and shape food patties. Additionally, machine 10 may include attachments for scoring, cubing, breading or otherwise modifying the food patties while the patties are still relatively soft and pliable. An example of one of these machines is a molding machine manufactured and sold by Formax, Inc. of Mokena, Illinois, known as a FORMAX 24 patty machine, having a capacity of as much as 30,000 patties per hour.

Molding machine 10 is followed by a freezing tunnel 11. Tunnel 11 may be of any of various types of commercial freezing equipment, preferably a cryogenic freezing apparatus. These tunnels are usually fast-freezing systems which rapidly freeze each food patty into a solid, brittle body. The food patties are conveyed along a conveyor 10A from molding machine 10 to freezing tunnel 11. Similarly, the frozen food patties pass from freezing tunnel 11, on a conveyor 11A, to a sheet application station 12 embodying the principles of the present invention. After application of protective sheets in station 12, the frozen food patties with protective sheets pass into a stacking station 13 that feeds an output conveyor 13A. The stacking station 13 may utilize stacking apparatus, such as manufactured and sold by Formax Inc. of Mokena, Illinois, of the kind described and claimed in the co-pending application of Thomas J. Carbon et al, Ser. No. 372,236, filed June 21, 1973 now U.S. Pat. No. 3,866,741 issued Feb. 18, 1975. The stacker 13 aligns and stacks the patties as desired for packaging, storage, and shipment.

At sheet application station 12, in accordance with one method embodiment of the present invention, as the frozen patties are fed toward stacking station 13 along the path defined by conveyor 11A, an edible adhesive material is applied to individual sheets of protective material or to the surface of each frozen patty. The protective sheet is usually moisture-resistant paper, though other materials can be employed. The adhesive is preferably applied to the protective sheet, since application to the patty may reduce effectiveness of the adhesive. Each protective sheet is then engaged with one frozen patty at a point ahead of the stacking station 13, so that the adhesive material bonds the sheet and the patty together. This procedure is repeated for each patty. Usually, the protective sheet is applied to the top surface of the patty.

The patties with the attached protective sheets are then discharged into stacking station 13. There the patties may be manipulated and stacked as is known in the art, using conventional stacking machines. The patties may be stacked with the protective sheets on their upper surfaces or they may be turned 180° in the stacker so the protective sheet is on the bottom of each patty. In any case, the patties may be manipulated virtually as desired, since the protective sheets are firmly adhered to the patties.

FIG. 2 illustrates one form of sheet application station 12 and stacker 13 in more detail. The sheet applicator 12 comprises a rotor 20 with a plurality of arms, rotating in the direction of the arrow A. Each arm of rotor 20 carries a suction pickup device 21. Each suction device 21 picks up a protective sheet 22 from the bottom of a stack in a sheet supply hopper 23. Rotor 20 then rotates to move the sheet 22 to an adhesive application station 25. Station 25 includes a pool of liquid edible adhesive 26, such as honey or corn syrup, which is applied through a sequence of rollers 27 and 28 to the protective sheet 22 while the sheet is still held by the suction device 21.

As rotor 20 continues its movement, it comes into alignment with a frozen food patty 30 on conveyor 11A and presses the protective sheet 22 against the surface of food patty 30. The vacuum in device 21 is then released. Alternatively, the adhesive may be strong enough to pull the protective sheet 22 away from the rotor arm suction device 21 and adhere sheet 22 to food patty 30. A roller 33 may be provided to press each sheet 22 more firmly into engagement with its associated patty 30. The frozen food patty continues on conveyor 11A into stacking station 13. Conveyor 13A and stacker 35 operate to stack several patties with protective sheets upon one another for further packaging and shipping.

The edible adhesive must be one which will adhere to a frozen food patty while being sufficiently neutral in taste, color, odor, etc. to avoid adversely affecting the overall taste and appearance of the food patty. As mentioned before, honey and corn syrup solutions are preferred adhesives. However, other edible adhesives can be used, including sugar solutions or, in some cases, even water.

With any of these adhesives, a strong bond can be formed between the protective sheet and the food patty. Thus, there is no need to coat the entire surface of the sheet or patty with adhesive; limited spots, lines or other portions of the sheet or patty can be coated, thereby effectively "spot welding" the sheet to the patty. Of course, there should be enough adherence to keep the sheet and patty firmly combined during manipulation, stacking, storage and shipment. However, with a small surface area of adherence, the protective sheets can be more easily separated from the patties for use than when the full sheet surface is bound to the patty.

The protective sheets 22 may be formed of waxed paper, paper coated with some other water resistant substance, or other paper as desired. Other protective sheet materials, such as cellophane or plastic film, can also be used.

While individual pre-cut protective sheets 22 are shown as being stored in hopper 23, a continuous dispenser of a web of protective material which is cut to the desired length immediately prior to pickup by apparatus 20, 21 can be used. Similarly, while the adhesive station is shown as employing rollers 27 and 28 for applying a fluid adhesive 26 to the sheets 22, the adhesive may be applied by other means such as spray or drip applicators.

Although the entire mating surface area of the protective sheet 22 (or the food patty 30) can be coated with the adhesive 26, this is usually unnecessary and, indeed, undesirable. A small, centralized spot of adhesive is often quite adequate. A pattern of adhesive dots 26A may be employed, as shown in FIG. 3, or a series of narrow stripes 26B as seen in FIG. 4. Construction of the applicator element 28 (FIG. 2) to achieve these or similar adhesive patterns, on either the protective sheets or the patties, is easily achieved.

FIG. 5 illustrates a modification of the method and apparatus described above in conjunction with FIG. 2 that may be employed in conjunction with a heat-activated adhesive. In this modified embodiment of the invention the adhesive is applied, at station 25 (FIG. 2), in two localized areas or spots 26C; the adhesive is on the opposite side of protective sheet 22 from that seen in FIG. 5. Rotor 20 is modified to include two small heating ducts 35, connected to a hot air supply (not shown), in association with each vacuum device 21 (FIG. 5). The outlets of ducts 35 are aligned alongside vacuum device 21 in registry with adhesive spots 26C.

With the arrangement shown in FIG. 5, heated air is supplied through ducts 35 to impinge upon the upper surface of protective sheet 22 in coordination with application of the protective sheet to frozen food patty 30. The hot air causes localized heating of the protective sheet and heats the adhesive on the opposite side of the sheet, at the interface with patty 30. Heating may be initiated just before sheet 22 is brought into engagement with patty 30.

FIG. 6 shows a further embodiment 12A for the sheet applicator of the invention. As before, a rotor arm suction device 21 deposits a protective sheet 22 upon a frozen food patty 30. Sheet 22 may carry a previously-applied heat-activatable adhesive on the sheet surface that interfaces with patty 30. The patty then continues along conveyor 11A to a heating device 31. In device 31, protective sheet 22 is subjected to localized heating and the adhesive is thus activated to form an adhering spot or spots of adherence between sheet 22 and patty 30. Similar stacking arrangements, freezing tunnels and molding machines (FIG. 1) may be utilized with this embodiment.

When a heat activated adhesive is utilized it may be applied to either the frozen patty 30 or the protective sheet 22. Device 31 is essentially similar to a rotary soldering iron, and may be equipped with a plurality of heated projections 32. Patterns of spot adhesion corresponding to those shown in FIGS. 3–5 are readily achieved. A reciprocal heater element can be substituted for rotary device 31 if desired. When using a heat activated adhesive, lesser amounts of adhesive may be used.

In some instances, the protective sheet can be attached by utilizing moisture already present in the frozen food patty. Moisture on or near the patty surface is temporarily melted by the heat source 31, conducting heat through the protective material, thus spot melting an area on the frozen patty. The water refreezes almost immediately, forming a bond between patty 30 and protective sheet 22. Thus, after the placement of the protective sheet over the frozen food patty, heating device 31 melts a small portion of the surface of the food patty by applying heat to the protective sheet only to the extent necessary to temporarily melt the water in contact with the sheet opposite the heat source and allow the water to quickly refreeze after the heat source is removed, attaching the patty to the protective sheet. A localized hot-air device, like that described in connection with FIG. 5, can also be used separately from the paper feed, in the manner of device 31 (FIG. 6). Of course, various combinations of heat-activated attachment and adhesive attachment may be utilized, such as by using minor amounts of liquid adhesive to hold each protective sheet in place on a patty prior to completion of a stronger attachment made with a heat source such as device 31.

If it is desired to apply adhesive to the frozen patties 30, rather than to sheets 22, then a heat-activation device such as device 31 should be utilized, since the adhesive will usually freeze upon contact with the frozen food patty. The frozen patties may contain a sufficient amount of moisture near the patty surface, or water may be applied to the top surface of the patties to serve as the adhesive. The protective sheets can then be applied to the top surfaces of the patties and the heating source (e.g., device 31) can tack them together at one or several points by temporarily remelting the water, which again refreezes promptly after the application of heat is interrupted. In this form of the invention, the adhesive is water.

In all embodiments of the invention, adherence between each protective sheet and its associated frozen patty is preferably limited to only a small fractional portion of the interface area between the two. For an adhesive that does not entail heat activation, but retains adherence at room temperature, this is important in assuring convenient removal of the protective sheet when the food patty is to be used. It is equally important for heat-activated adhesion, whether using a separate adhesive or using the patty moisture as adhesive, since it prevents damage to the patty from excessive general surface heating.

We claim:
1. The method of interleaving frozen food patties with sheets of protective material, comprising:
    A. feeding the frozen patties along a given path toward a stacking station;
    B. engaging a sheet of protective material with a frozen food patty at a point on the path ahead of the stacking station;
    C. applying an edible adhesive material to one of the mating surfaces of the protective sheet and the food patty prior to step B, so that the adhesive material bonds the sheet to the patty;
    D. repeating steps B and C for each patty;
    E. and stacking the patties, with the protective sheets bonded thereto, at the stacking station.

2. The method of interleaving frozen food patties and protective sheets, as set forth in claim 1, in which the edible adhesive is applied to only a small fractional portion of the total engaging surface area.

3. The method of interleaving frozen food patties and protective sheets, as set forth in claim 2, in which the edible adhesive is applied in a pattern of small dots on the surface of each protective sheet.

4. The method of interleaving frozen food patties and protective sheets, as set forth in claim 2, in which the edible adhesive is applied in a pattern of thin stripes on the surface of each protective sheet.

5. The method of interleaving as set forth in claim 1, in which the adhesive employed is selected from the group consisting of honey, corn syrup, and sugar syrup.

6. The method of interleaving frozen food patties and protective sheets, as set forth in claim 1, including the additional step of heating at least a localized surface area of each protective sheet to activate the adhesive and thereby enable the adhesive to bond each sheet to its patty.

7. The method of interleaving frozen food patties and protective sheets, as set forth in claim 6, in which the localized heating is effected from the surface of the protective sheet opposite the patty after the application of adhesive and after the protective sheet is engaged with the patty.

8. The method of interleaving frozen food patties with sheets of protective material, comprising:
    A. feeding the frozen patties along a given path toward a stacking station;
    B. engaging a sheet of protective material with a frozen food patty at a point on the path ahead of the stacking station;
    C. heating at least a part of the surface area of the protective sheet to momentarily spot melt a part of the engaging surface areas of the patty and the sheet, and allowing the melted part to refreeze and thereby bond the sheet to the patty;
    D. repeating steps B and C for each patty;
    E. and stacking the patties, with the protective sheets bonded thereto, at the stacking station.

9. The method of interleaving frozen food patties with sheets of protective material, as set forth in claim 8, in which only a small fractional portion of the surface areas of the protective sheet and the patty are heated.

10. The method of interleaving frozen food patties with sheets of protective material, as set forth in claim 9, in which step C is carried out by contacting a solid heating element with the outer surface of the protective sheet after engagement of the protective sheet with the patty.

11. The method of interleaving frozen food patties with sheets of protective material, as set forth in claim 9, in which step C is carried out by applying a stream of hot air to the outer surface of the protective sheet.

* * * * *